United States Patent [19]

Cole, Jr. et al.

[11] 3,891,430

[45] June 24, 1975

[54] RECOVERY OF LEAD

[75] Inventors: Ernest R. Cole, Jr.; Waldemar M. Dressel; Lawrence L. Smith, all of Rolla, Mo.

[73] Assignee: The United States of America as represented by the Secretary of the Interior, Washington, D.C.

[22] Filed: June 25, 1973

[21] Appl. No.: 371,019

[52] U.S. Cl. .............................. 75/77; 75/91; 75/6; 423/563
[51] Int. Cl. .......................................... C22b 13/00
[58] Field of Search .......................... 75/77–79, 23, 75/25, 91, 6, 7, 8, 9; 423/563

[56] References Cited
UNITED STATES PATENTS

| | | | |
|---|---|---|---|
| 414,713 | 11/1889 | Koneman | 75/6 |
| 2,839,381 | 6/1958 | Lee | 75/91 X |

OTHER PUBLICATIONS

Spagnola, Bureau of Mines Report Investigations, 6662, U.S. Dept. Interior, 1965.

*Primary Examiner*—L. Dewayne Rutledge
*Assistant Examiner*—M. J. Andrews
*Attorney, Agent, or Firm*—William S. Brown

[57] ABSTRACT

Lead is recovered from lead sulfide-containing material by means of a process comprising (1) vaporization of PbS at elevated temperature in a first reaction zone, (2) separation of the vaporized PbS from said reaction zone and (3) vapor-phase reduction of the PbS with hydrogen gas at elevated temperature in a second reaction zone to form metallic lead and hydrogen sulfide.

2 Claims, No Drawings

RECOVERY OF LEAD

Conventional lead smelting processes, which have remained essentially unchanged since their inception, are complex, inefficient and pollution prone. In particular, copious amounts of $SO_2$ are evolved to the atmosphere, thus creating severe pollution problems. Furthermore, the $SO_2$ that is recovered is converted to sulfuric acid, which is difficult to store and handle and the shipping cost is high.

It has now been found, according to the invention, that these problems may be greatly alleviated by means of a process in which lead is recovered from a lead sulfide-containing material by vaporization of PbS, followed by reduction of the PbS, in vapor form, by hydrogen gas in a separate reaction zone.

Reduction of PbS in the solid state by means of hydrogen gas is disclosed in Bureau of Mines Report of Investigations 6662. However, this reaction is very slow due to partial reduction of the outer layers of the charge which interferes with contact between the PbS and the hydrogen gas. In addition, the reaction is considerably damped by the presence of gangue materials.

An essential aspect of the invention is that of preventing the hydrogen reducing gas from contacting the unvaporized PbS. Accordingly, the process of the invention is carried out in a two-zone reaction vessel, the first adapted to vaporization of the PbS and the second adapted to the reaction of the vaporized PbS and gaseous hydrogen. Subject to the necessity for two reaction zones, however, the apparatus may consist of any conventional reaction vessels, such as tube furnaces, rotary kilns or fluidized beds, capable of providing the required temperatures and means for introducing and removing gaseous reactants and products. The two zones may be separated by a baffle adapted to permit flow of gases or vapors in one direction only.

The feed material in the process of the invention may be any PbS-containing material from which the PbS can be removed by heating to a temperature sufficient to cause vaporization of the PbS. Suitable materials include minerals or ores such as galena, as well as other PbS-containing material such as PbS mill concentrates, zinc and molybdenite mill concentrates and lead matte. The feed can be in a finely divided state, e.g., −65 mesh flotation concentrates. Or, pellets made from concentrates or other materials may be used.

A temperature of 900° to 1200°C is generally satisfactory for the vaporization reaction. Optimum temperature may, however, vary considerably with the type and amount of feed material, amount of inert gas, as discussed below, desired purity of the product lead, etc., and is best determined experimentally. When ZnS is a component of the feed, the temperature should be kept below about 1100°C to minimize volatilization of the ZnS. Optimum time of the vaporization reaction will also depend on the above variables.

An inert gas is preferably employed to carry the vaporized PbS into the second zone, where the reaction with hydrogen takes place. The inert gas may be injected into the first reaction (vaporization) zone at a point above the feed material or, alternatively, it may be introduced directly into the feed material, thereby also serving to agitate the feed material. Suitable inert gases include nitrogen, helium, and argon, with nitrogen generally being preferred for purposes of economy and availability. Flow rate of the gas should be sufficient to completely vaporize the PbS at the desired temperature within a given period of time.

The reduction reaction in the process of the invention consists of reaction of the vaporized PbS with gaseous hydrogen according to the reaction $$PbS_{(g)} + H_2 \rightarrow Pb_{(1)} + H_2S.$$

A temperature of about 750° to 1200°C is usually satisfactory for the reaction. Thus, the second reaction zone is maintained within this temperature range. Generally, an excess of hydrogen, e.g., about 15 to 20 times the stoichiometric amount, is necessary for maximum conversion of the PbS to metallic lead.

The resulting lead vapor is condensed and collected in any suitable manner. E.g., it may be condensed on the walls of a cool portion of the second reaction zone, and the metallic lead collected on completion of the reaction. Or, in a continuous operation, the condensed lead may be collected in any suitable collecting means such as wells or traps and tapped off at appropriate intervals.

The process of the invention provides a simple, efficient means of recovering lead of a purity of 99.9 percent or higher. Elemental sulfur can also be readily recovered from the product $H_2S$ by the Claus process or some modification thereof. In addition, by-products such as copper, silver and zinc can be recovered from the gangue material constituting the residue from the PbS vaporization reaction.

The invention will be more specifically illustrated by the following example.

EXAMPLE

The feed material consisted of a 10 gram sample of mill concentrate containing 88.2 percent PbS, with the remainder comprising minor amounts of zinc sulfide, silica, alumina, calcium, copper and iron.

The reaction vessel consists of a horizontally oriented glass tube 38 mm in diameter and 900 mm long. The tube was constricted to 3.2 mm at its center to divide it into two reaction zones. The sample was added to the vaporization zone and the reaction vessel was placed in a tube furnace adapted to provide a temperature of 950°C to the vaporization zone. The furnace also provided a temperature of 950°C to the reduction zone, except for a portion of about 250 mm which protruded from the furnace.

The vaporization zone was provided with a gas entry tube, located just above the sample, by means of which a stream of helium was admitted at a flow rate of 500 cc/min (STP).

The reduction zone was also provided with a gas entry tube, located just above the constriction between the zones, by means of which hydrogen gas was admitted at a flow rate of 300 cc/min (STP). The reduction zone was also provided with a gas outlet tube for discharge of helium, product hydrogen sulfide gas and unreacted hydrogen.

After a reaction period of 3 hours, product lead that had condensed on the cold wall of the portion of the reactor protruding from the furnace was removed and analyzed. It was found that 97.94 percent of the lead in the feed was recovered, and that the purity of the recovered lead was 99.9+ percent, with zinc as the only significant impurity.

We claim:

1. A process of recovery of lead from a lead sulfide-containing material comprising (1) vaporization of lead sulfide at a temperature of about 900° to 1200°C in a first reaction zone, (2) separation of the vaporized lead sulfide from said reaction zone and (3) vapor phase reduction of the lead sulfide with hydrogen at a temperature of about 750° to 1200°C in a second reaction zone to form metallic lead and hydrogen sulfide.

2. The process of claim 1 in which the vaporized lead sulfide is transported from the first reaction zone to the second reaction zone by means of an inert gas.

* * * * *